US012247533B2

(12) United States Patent
Miwa

(10) Patent No.: US 12,247,533 B2
(45) Date of Patent: Mar. 11, 2025

(54) FOREIGN MATTER INTRUSION PREVENTION STRUCTURE

(71) Applicant: Isuzu Motors Limited, Kanagawa (JP)

(72) Inventor: Junichi Miwa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 18/675,197

(22) Filed: May 28, 2024

(65) Prior Publication Data

US 2024/0401549 A1 Dec. 5, 2024

(30) Foreign Application Priority Data

May 31, 2023 (JP) ................................ 2023-089941

(51) Int. Cl.
*F02M 26/74* (2016.01)
*F02M 26/15* (2016.01)
*F02M 26/35* (2016.01)

(52) U.S. Cl.
CPC ............ *F02M 26/74* (2016.02); *F02M 26/15* (2016.02); *F02M 26/35* (2016.02)

(58) Field of Classification Search
CPC ......... F02M 26/74; F02M 26/15; F02M 26/35
See application file for complete search history.

(56) References Cited

U.S. PATENT DOCUMENTS

2016/0348615 A1* 12/2016 Fischer .................. F02M 35/02
2021/0370207 A1* 12/2021 Kim ....................... F02M 26/29

FOREIGN PATENT DOCUMENTS

JP 2012-202265 10/2012
JP 2019-065715 4/2019

* cited by examiner

*Primary Examiner* — Jacob M Amick
*Assistant Examiner* — Charles J Brauch

(57) ABSTRACT

The present disclosure prevents foreign matter such as particles composed of soot and hydrocarbons from entering an EGR passage. Thus, a foreign matter intrusion prevention structure includes: an internal-combustion engine; an intake manifold that introduces outside air into a cylinder of the internal-combustion engine; an exhaust manifold that collects exhaust gas discharged from the cylinder of the internal-combustion engine; an exhaust gas purifying device that is connected to the exhaust manifold through an exhaust duct; an exhaust gas recirculation device that sends a part of the exhaust gas from the exhaust manifold to the intake manifold without passing the part of the exhaust gas through the exhaust gas purifying device; and an intrusion prevention net provided in a vicinity of an inlet from the exhaust manifold to the exhaust gas recirculation device.

7 Claims, 9 Drawing Sheets

FOREIGN MATTER INTRUSION PREVENTION STRUCTURE

CROSS REFERENCE TO RELATED APPLICATIONS

This application claims the benefit of priority of Japanese Patent Application No. 2023-089941, filed on May 31, 2023, the disclosure of which including the specification, drawings and abstract is incorporated herein by reference in its entirety.

TECHNICAL FIELD

The present disclosure relates to a technique for preventing foreign matter such as particles composed of soot and hydrocarbons from entering an EGR passage.

BACKGROUND ART

As structures of intake and exhaust systems of an internal-combustion engine, those described in Patent Literature (hereinafter, referred to as PTL) 1 and PTL 2 are known, and FIG. 9 is a schematic diagram thereof. Each of a plurality of cylinders 9 formed in engine body 8 is provided with injector 10, which is configured to inject fuel into cylinder 9. The foreign matter in the air taken from the outside of the vehicle is removed by air cleaner 1, and then the air is pressurized by compressor 2 of a turbocharger, passes through intake passages 3 and 5, is cooled by intercooler 4, and is sent to inlet manifold 7. Intake passage 5 is provided with intake throttle 6 for adjusting the flow rate of the air to be supplied to inlet manifold 7. The air sent to inlet manifold 7 is distributed to each cylinder 9.

Meanwhile, exhaust gas generated by burning fuel in cylinder 9 is collected in exhaust manifold 11 and discharged to the outside of the vehicle through exhaust duct 14. Turbine 12 of the turbocharger is provided to exhaust duct 14 and rotated by the pressure of the exhaust gas. This rotational force rotates compressor 2. Further, exhaust duct 14 is provided with exhaust throttle 13 for adjusting the flow rate of the exhaust gas. Furthermore, exhaust duct 14 is provided with an exhaust gas purifying device for removing soot (fine particles, PM) and nitrogen oxides (NOx) in the exhaust gas.

Exhaust throttle 13 is configured so that decreasing exhaust throttle 13 increases the internal exhaust pressure to increase the exhaust resistance from cylinder 9. This increases the rotational resistance of the engine and can enhance the action of the engine brake.

The exhaust gas purifying device includes Diesel Particulate Defuser (DPD) 31 for collecting, burning, and removing soot in the exhaust gas, and Selective Catalytic Reduction (SCR) 32 for decomposing nitrogen oxides in the exhaust gas. DPD 31 includes oxidation catalyst 15 (DOC: Diesel Oxidation Catalyst), temperature sensor 16, soot collection filter 17 (CSF: Catalyzed Soot Filter), and collection filter differential pressure sensor 18, and the soot in the exhaust gas is collected by soot collection filter 17. DPD 31 is sometimes provided in an engine compartment to improve the mounting property.

As the vehicle travels repeatedly, soot collection filter 17 is clogged with the collected soot. This clogging is detected by measuring the pressure difference between the upstream side and the downstream side of soot collection filter 17 by collection filter differential pressure sensor 18. When the pressure difference becomes higher than or equal to a predetermined value, a regeneration process of soot collection filter 17 is performed. The regeneration process includes automatic regeneration performed while the vehicle is traveling and manual regeneration performed by an operation of a driver while the vehicle stops. In the regeneration process, when unburned fuel is sent to DPD 31 together with the exhaust gas, the unburned fuel is burned by oxidation catalyst 15, and the exhaust gas is heated. Then, this heated exhaust gas burns the soot collected by soot collection filter 17.

SCR 32 includes urea injector 19, NOx reduction catalyst 20, and ammonia oxidation catalyst 21. When urea solution is supplied from urea injector 19 to the exhaust gas, the urea solution is hydrolyzed, and ammonia is produced. When this ammonia and the nitrogen oxides in the exhaust gas are sent to NOx reduction catalyst 20, the nitrogen oxides are reduced, and nitrogen and water are produced. The remaining ammonia is oxidized by ammonia oxidation catalyst 21 provided in the subsequent stage, and nitrogen and water are produced.

Further, Exhaust Gas Recirculation (EGR) systems 33 and 34 (exhaust gas recirculation devices) are provided to improve fuel consumption of the engine and reduce nitrogen oxides in exhaust gas. Nitrogen oxides are known to be produced by nitrogen and oxygen in the air reacting with each other at a high temperature. EGR systems 33 and 34 are to lower a combustion temperature by mixing the exhaust gas and the intake air of the engine and lowering the oxygen concentration in cylinder 9, and to reduce the generation of nitrogen oxides. EGR systems 33 and 34 are constituted by high-pressure EGR system 33 and low-pressure EGR system 34. In high-pressure EGR system 33, high-pressure EGR passages 22 (upstream pipe) and 24 (downstream pipe) branch off from exhaust manifold 11, and send exhaust gas to inlet manifold 7 through high-pressure EGR cooler 23 and high-pressure EGR valve 25. Meanwhile, in low-pressure EGR system 34, low-pressure EGR passage 26 branches off from the exhaust gas purification system, and sends exhaust gas to the intake passage through low-pressure EGR cooler 27 and low-pressure EGR valve 28.

PTLs 1 and 2 disclose providing a filter member at an inlet of low-pressure EGR system 34 branching off from the exhaust gas purifying device. This filter member is for preventing foreign matter generated by defects or the like of the exhaust gas purifying device from entering the intake air side through low-pressure EGR 34 and damaging the compressor of the turbocharger.

CITATION LIST

Patent Literature

PTL 1
Japanese Patent Application Laid-Open No. 2019-065715
PTL 2
Japanese Patent Application Laid-Open No. 2012-202265

SUMMARY OF INVENTION

Technical Problem

In PTLs 1 and 2, while a filter member is provided at the inlet of the low-pressure EGR system, no filter member is provided at the inlet of the high-pressure EGR system. This is because there are various devices such as an exhaust gas purifying device upstream of the low-pressure EGR system, and thus a compressor on the downstream side is possibly damaged due to the defects or the like of these various devices, whereas there is no risk of foreign matter resulting from defects or the like entering the high-pressure EGR system.

However, the inventors of the present application have found that repeatedly performing a manual regeneration process of DPD causes particles containing soot to be deposited in the vicinity of the inlet of high-pressure EGR passage 22. This deposit is composed of mixed particles of soot and hydrocarbons and composed of soot in the exhaust gas and unburned fuel (hydrocarbons) injected during the regeneration process of DPD. In the case of performing the manual regeneration process or the regeneration process while driving at a low speed and low load, high-pressure EGR valve 25 is closed and exhaust throttle 13 is decreased to reduce the flow rate of the exhaust gas. This leads to an increased internal exhaust pressure and a volume change of the exhaust gas cooled in high-pressure EGR cooler 23, making particles of soot and hydrocarbons generated during the regeneration process more likely to enter high-pressure EGR passage 22. Particles entering high-pressure EGR passage 22 are cooled, and the hydrocarbons resinify and is deposited in high-pressure EGR passage 22. As this depositing of the particles progresses, a problem occurs in that high-pressure EGR passage 22 is blocked. This depositing of the particles is noticeable when high-pressure EGR passage 22 is connected downward with respect to exhaust manifold 11.

An object of the present disclosure is to provide a foreign matter intrusion prevention structure that prevents intrusion of foreign matter into a high-pressure EGR passage, in particular, prevents intrusion of particles composed of soot and hydrocarbons into the high-pressure EGR passage even when a manual regeneration process is repeatedly performed, and that effectively discharges soot to the outside of vehicle.

Solution to Problem

To achieve the above object, a foreign matter intrusion prevention structure of the present discloser includes: an internal-combustion engine; an intake manifold that introduces outside air into a cylinder of the internal-combustion engine; an exhaust manifold that collects exhaust gas discharged from the cylinder of the internal-combustion engine; an exhaust gas purifying device that is connected to the exhaust manifold through an exhaust duct; an exhaust gas recirculation device that sends a part of the exhaust gas from the exhaust manifold to the intake manifold without passing the part of the exhaust gas through the exhaust gas purifying device; and an intrusion prevention net provided in a vicinity of an inlet from the exhaust manifold to the exhaust gas recirculation device.

Advantageous Effects of Invention

According to the present disclosure, intrusion of foreign matter from an exhaust manifold into an exhaust gas recirculation device is prevented. Further, by collecting particles composed of soot and hydrocarbons by an intrusion prevention net, the particles are exposed to the heat of exhaust gas, the hydrocarbons vaporize, and the soot remains. The remaining soot more easily passes through the net and is discharged to the outside riding the exhaust flow, which reduces time and effort to replace and maintain the intrusion prevention net, and effectively prevents intrusion and accumulation of particles into and on the exhaust gas recirculation device.

DESCRIPTION OF EMBODIMENTS

Figure 1:
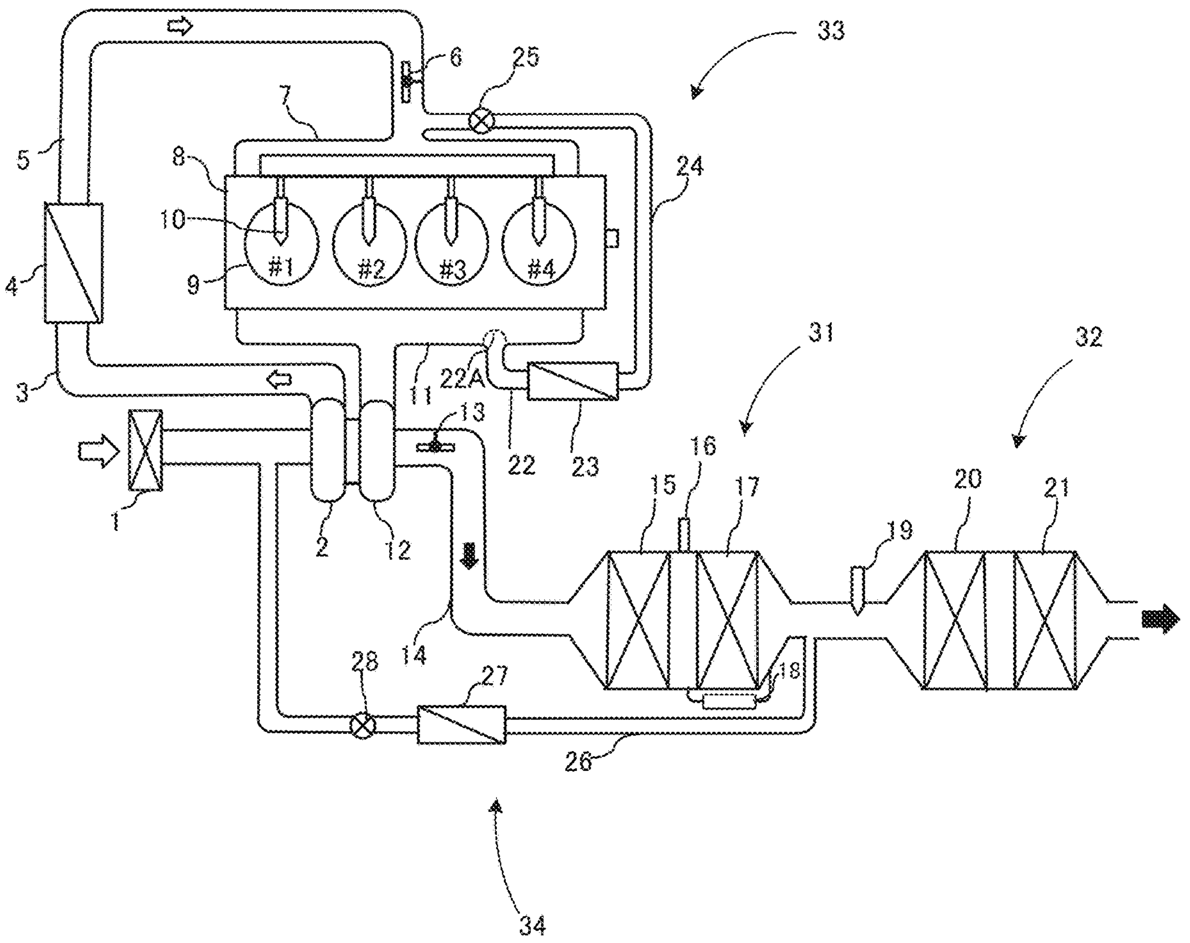
FIG. 1 is a schematic diagram illustrating intake and exhaust systems according to an embodiment of the present disclosure.
Figure 9:
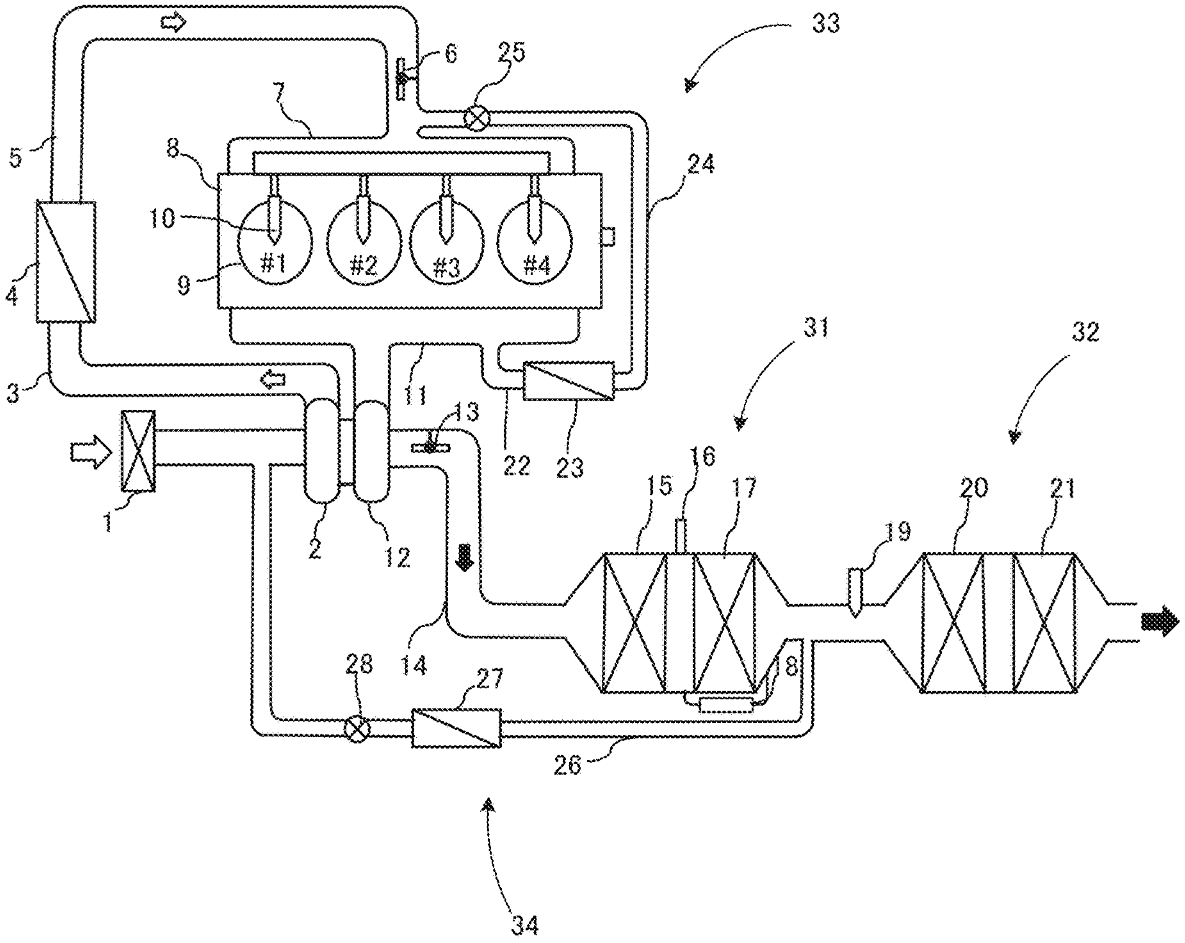
FIG. 9 is a diagram for describing a conventional technique.

Hereinafter, embodiments of the present disclosure will be described with reference to the drawings. FIG. 1 is a schematic diagram illustrating configurations of intake and exhaust systems of an engine according to an embodiment. Portions in common with the conventional technique described in FIG. 9 are denoted by the same reference numerals, and a detailed description thereof will be omitted. In the example illustrated in FIG. 1, intrusion prevention net 22A is provided at a portion where high-pressure EGR passage 22 branches off from exhaust manifold 11.

Figure 2A:
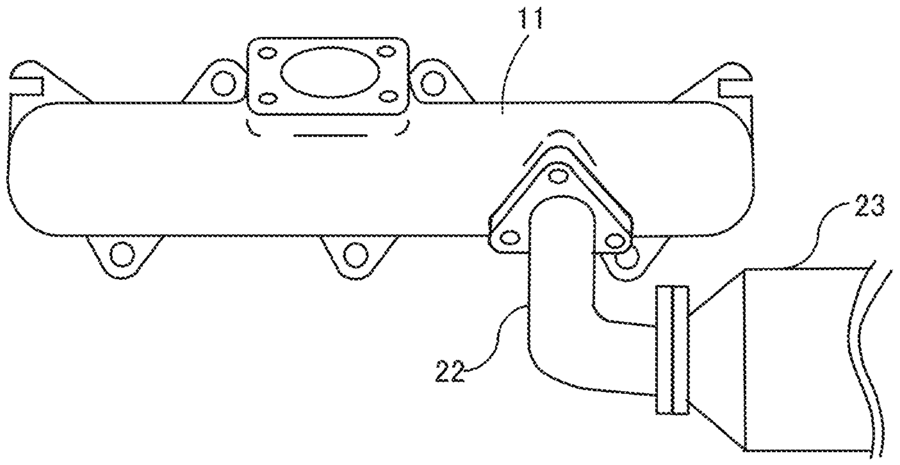
FIGS. 2A and 2B are enlarged views of a portion connecting an exhaust manifold and a high-pressure EGR system.
Figure 2B:
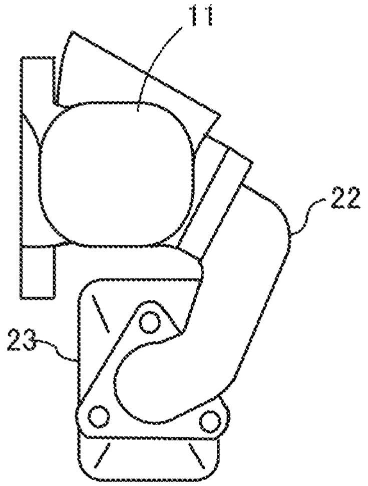
Figure 3A:
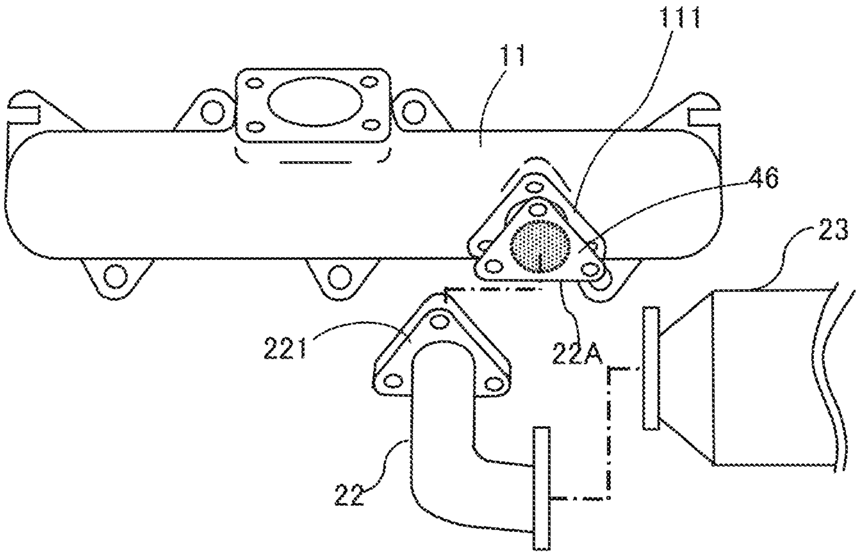
FIGS. 3A and 3B are exploded views of the portion illustrated in FIGS. 2A and 2B.
Figure 3B:
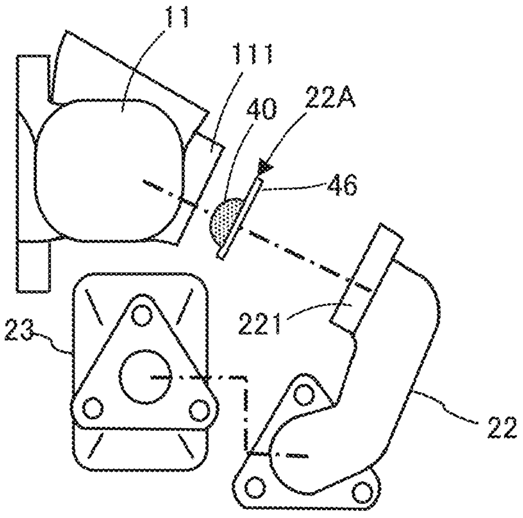

FIGS. 2A and 2B are respectively enlarged front and left side views of a portion connecting exhaust manifold 11 and high-pressure EGR passage 22. High-pressure EGR passage 22 is connected to exhaust manifold 11 downward from exhaust manifold 11, and high-pressure EGR cooler 23 is connected to high-pressure EGR passage 22. FIGS. 3A and 3B are exploded views of the portion illustrated in FIGS. 2A and 2B. Exhaust manifold 11 and high-pressure EGR passage 22 are respectively provided with exhaust-manifold-side flange 111 and high-pressure-EGR-side flange 221, which are formed in substantially triangular shapes, and exhaust manifold 11 and high-pressure EGR passage 22 are connected to each other with these flange portions (flange 111 and flange 221) being fastened. Then, intrusion prevention net 22A is interposed between the flange portions. Intrusion prevention net 22A is a plate-shaped member having substantially the same shape as the flange portions, and a portion corresponding to the flow passage of the exhaust gas is formed by a net.

Figure 4:
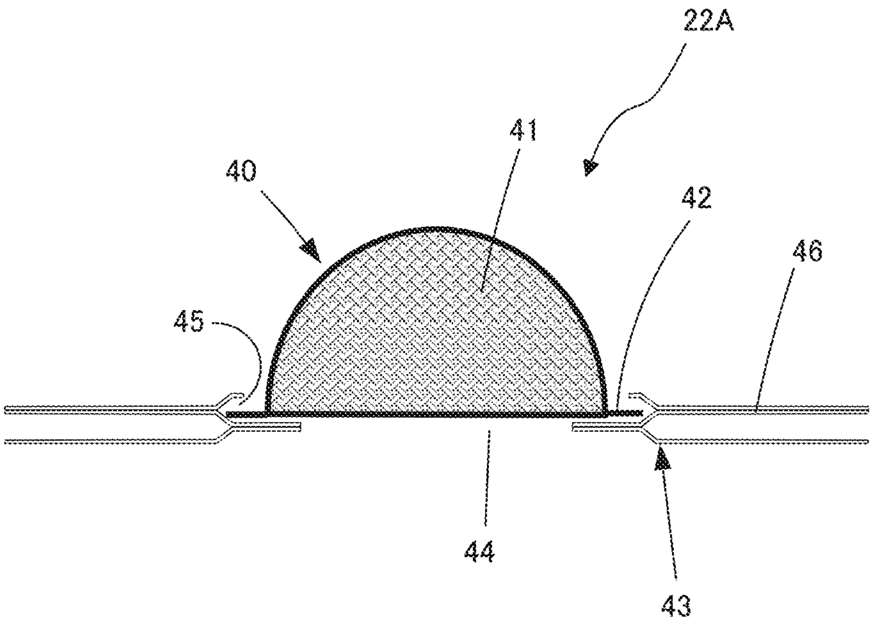
FIG. 4 is a diagram for describing an intrusion prevention net.

As illustrated in FIG. 4, intrusion prevention net 22A includes net 40 and gasket 43. Net 40 includes net portion 41 formed in the central portion and net flange portion 42 formed on the periphery of net portion 41. Net portion 41 is formed in a dome shape protruding toward the upstream side in the flow direction of the exhaust gas. Opening 44 is formed in the central portion of gasket 43, and annular groove portion 45 which engages with net flange portion 42 is formed outside opening 44. A portion of gasket 43 outside annular groove portion 45 is gasket flange portion 46 interposed between the flange portions of exhaust manifold 11 and high-pressure EGR passage 22.

A manual regeneration process of DPD 31 will be described. When the driver stops the vehicle and operates a manual regeneration button (not illustrated), the engine is operated at a low speed (approximately 1000 rpm). At this time, high-pressure EGR valve 25 is closed, which stops sending the exhaust gas to intake passage 5. Further, decreasing exhaust throttle 13 increases the internal pressure of the exhaust gas and thus increases the temperature of the exhaust gas. Then, oxidation catalyst 15 is warmed to higher than or equal to the activation temperature. Further, injector 10 performs post-injection, whereby unburned fuel is sent to exhaust duct 14 together with the exhaust gas and is burned in oxidation catalyst 15, and then the warmed exhaust gas burns the soot collected by soot collection filter 17. At this time, the exhaust gas in high-pressure EGR passage 22 is cooled by high-pressure EGR cooler 23, the volume reduces, and the exhaust internal pressure is further increased, which causes a part of the exhaust gas in exhaust manifold 11 to flow into high-pressure EGR passage 22. However, intrusion prevention net 22A is provided at the portion connecting exhaust manifold 11 and high-pressure EGR passage 22, so that the particles composed of soot in the exhaust gas and unburned fuel is collected in intrusion prevention net 22A, and the intrusion into high-pressure EGR passage 22 is prevented.

By forming intrusion prevention net 22A in a dome shape protruding toward the side of exhaust manifold 11, the surface area of net 40 increases, and thus a greater amount of particles can be collected, which eliminates the risk of net 40 clogging.

Since intrusion prevention net 22A is provided close to exhaust manifold 11, the ambient temperature of the collected particles is equal to the temperature in exhaust manifold 11 in the normal operation of the internal-combustion engine, for example, higher than or equal to approximately 360° C., at which unburned fuel vaporizes. Thus, the unburned fuel in the particles collected in net 40 vaporizes, and the soot is discharged, riding the exhaust flow from exhaust manifold 11 toward exhaust duct 14. Note that, as a position where intrusion prevention net 22A is provided, a position is preferred where the temperature is higher than or equal to the temperature at which the vapor pressure of unburned fuel is equal to the pressure of the exhaust gas in the normal operation of the internal-combustion engine.

Figure 5:
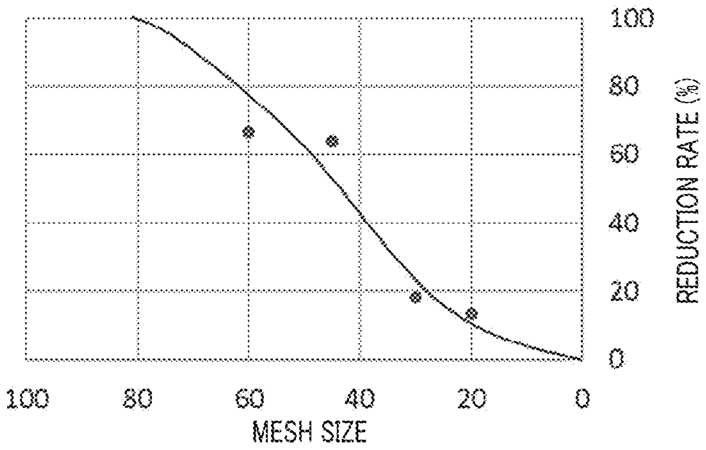
FIG. 5 is a graph indicating a relationship between a mesh size of the intrusion prevention net and a reduction rate of particles.

FIG. 5 illustrates a relationship between the mesh size of net portion 41 and the reduction rate of intrusion of particles composed of soot and hydrocarbons into high-pressure EGR passage 22. As the mesh size increases (the meshes of the net become smaller), the reduction rate improves, and the reduction rate is approximately 50% with the mesh size 40 and 66.8% with the mesh size 60. Note that it is preferred that the opening area of the intrusion prevention net be capable of collecting 50% or more of particles having a central particle size of 330 μm.

Figure 6:
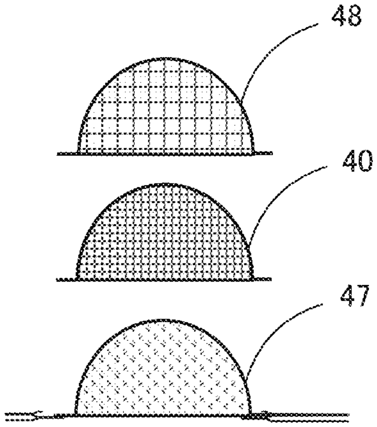
FIG. 6 is an exploded view of a reinforcing structure of the intrusion prevention net.

FIG. 6 illustrates another embodiment of intrusion prevention net 22A. Intrusion prevention net 22A receives exhaust pressure, and becomes easy to tear in particular when a wire diameter of the net is thinned (that is, the mesh size is increased to reduce the intrusion of particles). Thus, perforated metal 47 for reinforcement (reinforcing member) is provided on the downstream side of net 40, and fixing member 48 for fixing net 40 is provided on the upstream side, which makes intrusion prevention net 22A have a three-layer structure. Perforated metal 47 and fixing member 48 are formed of breathable members having larger meshes than net 40. Perforated metal 47 prevents net 40 from being pushed toward the high-pressure EGR passage side by the exhaust pressure and being deformed. Fixing member 48 prevents net 40 from being deformed or vibrated due to pulsation or the like of the flow of the exhaust gas. Accordingly, net 40 does not tear even when net 40 having a large mesh size is employed, and the rate of collecting particles can be enhanced. Note that intrusion prevention net 22A may have a two-layer configuration of net 40 and perforated metal 47 without providing fixing member 48.

Figure 7:
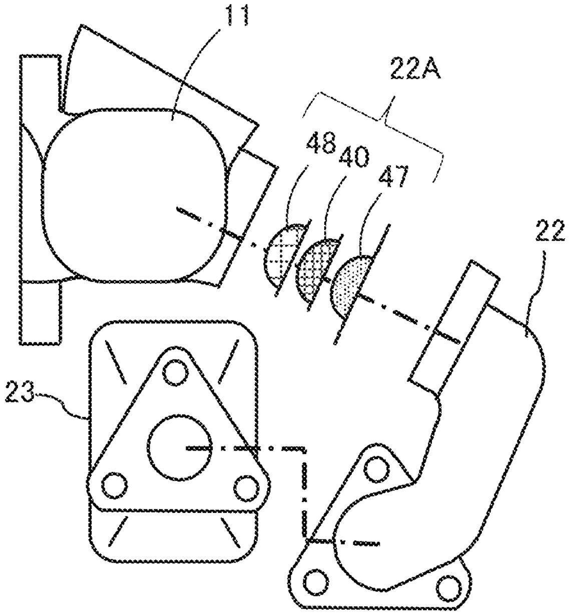
FIG. 7 is an exploded view of a structure in which the intrusion prevention net illustrated in FIG. 6 is attached.

FIG. 7 is an exploded view of a structure in which three-layer intrusion prevention net 22A illustrated in FIG. 6 is interposed between exhaust manifold 11 and high-pressure EGR passage 22. Fixing member 48, net 40, and perforated metal 47 are stacked in this order from the upstream side of the exhaust gas and interposed between exhaust manifold 11 and high-pressure EGR passage 22. Using three-layer intrusion prevention net 22A makes it possible to collect particles without net 40 tearing even when net 40 having a small wire diameter is employed.

Figure 8:
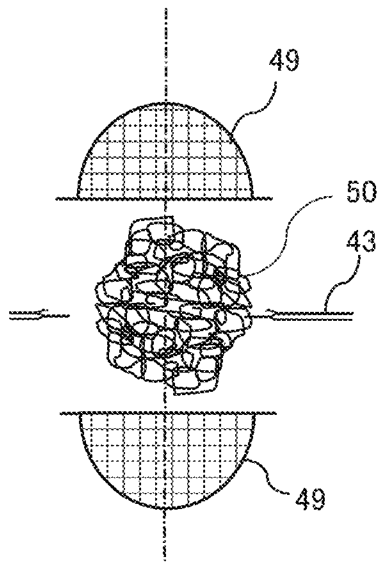
FIG. 8 is a diagram for describing another embodiment of the intrusion prevention net.

FIG. 8 illustrates another embodiment of intrusion prevention net 22A. In this example, steel wool 50 is housed in two outer-shell members 49 that are formed in hemispherical shapes and are coarsely netted. The wire diameter and density of steel wool 50 are designed to be capable of collecting particles composed of soot and hydrocarbons. This structure allows efficient collection of particles from the exhaust gas passing through steel wool 50.

While the embodiments have been described with reference to the drawings, the present invention specified in the claims is not limited by the description of the embodiment. For example, the structures of the engine, exhaust manifold, intrusion prevention net, and the like are not limited to those described above, and can be variously changed. Further, the attachment structure, shape, mesh size, and the like of the intrusion prevention net can be appropriately designed within the scope of the invention specified in the claims, and for example, the shape of the intrusion prevention net is not limited to a dome shape, and may be a flat plate shape.

INDUSTRIAL APPLICABILITY

The present disclosure is useful as a foreign matter intrusion prevention structure that prevents particles composed of soot and hydrocarbons from entering and being deposited into and on an EGR passage.

REFERENCE SIGNS LIST

7 Inlet manifold
8 Engine body
10 Injector
11 Exhaust manifold
15 Oxidation catalyst
17 Soot collection filter
22 High-pressure EGR passage
22A Intrusion prevention net
31 DPD
33 High-pressure EGR system

The invention claimed is:

1. A foreign matter intrusion prevention structure, comprising:

an internal-combustion engine;

an intake manifold that introduces outside air into a cylinder of the internal-combustion engine;

an exhaust manifold that collects exhaust gas discharged from the cylinder of the internal-combustion engine;

an exhaust gas purifying device that is connected to the exhaust manifold through an exhaust duct;

an exhaust gas recirculation device that sends a part of the exhaust gas from the exhaust manifold to the intake manifold without passing the part of the exhaust gas through the exhaust gas purifying device; and an intrusion prevention net provided in a vicinity of an inlet from the exhaust manifold to the exhaust gas recirculation device, wherein the intrusion prevention net is formed such that steel wool is housed in two outer-shell members that are formed in hemispherical shapes and are coarsely netted.

2. The foreign matter intrusion prevention structure according to claim 1, wherein the intrusion prevention net is positioned between the exhaust manifold and the exhaust gas recirculation device.

3. The foreign matter intrusion prevention structure according to claim 2, wherein the exhaust gas recirculation device includes an upstream pipe connected to the exhaust manifold, the upstream pipe including a flange formed on an upstream end portion of the upstream pipe, the exhaust manifold includes an exhaust-manifold-side flange joined to the flange of the upstream pipe, and the intrusion prevention net is attached while being interposed between the exhaust-manifold-side flange and the flange of the upstream pipe.

4. The foreign matter intrusion prevention structure according to claim 1, wherein the exhaust gas recirculation device is connected to the exhaust manifold downward therefrom.

5. The foreign matter intrusion prevention structure according to claim 1, wherein a position where the intrusion prevention net is provided is a position where, in a normal operation of the internal-combustion engine, a temperature is higher than or equal to a temperature at which a vapor pressure of unburned fuel is equal to a pressure of the exhaust gas.

6. The foreign matter intrusion prevention structure according to claim 5, wherein the position where the intrusion prevention net is provided is a position where the temperature is higher than or equal to 360° C. in the normal operation of the internal-combustion engine.

7. The foreign matter intrusion prevention structure according to claim 1, wherein an opening area of the intrusion prevention net is capable of collecting 50% or more of particles having a central particle size of 330 μm.

* * * * *